United States Patent

[11] 3,590,742

[72] Inventor Horace M. Swartz
Doylestown, Pa.

[21] Appl. No. 797,485
[22] Filed Feb. 7, 1969
[45] Patented July 6, 1971
[73] Assignee FMC Corporation
San Jose, Calif.

[54] MECHANICAL TOW TRUCK SWITCHING APPARATUS
16 Claims, 22 Drawing Figs.

[52] U.S. Cl. .......... 104/88
[51] Int. Cl. .......... B61j 3/04, E01b 7/04, B65g 17/42
[50] Field of Search .......... 104/88

[56] References Cited
UNITED STATES PATENTS
3,261,300 7/1966 Johnson .......... 104/88

*Primary Examiner*—Arthur L. La Point
*Assistant Examiner*—D. W. Keen
*Attorneys*—F. W. Anderson and C. E. Tripp

ABSTRACT: A mechanical switching apparatus for use in an automated tow truck system has a switchplate for diverting coded trucks from a main slot in a reference surface to a shunt slot intersecting the main slot. A coded reader head, located upstream from the switchplate, actuates a cable, operatively connected to the switchplate, to move the switchplate from a closed to an open position. A cam surface on the switch plate closes the switch when the cam surface is contacted by the truck which has been diverted into the shunt slot. Means are provided to prevent an inadvertent triggering of the reader head and other means are provided to prevent an inadvertent opening of the switchplate without a triggering of the reader head. A full spur device prevents the switchplate from diverting more than a predetermined number of trucks into the shunt slot.

In an alternative double reader head arrangement, simultaneous triggering of two coded reader heads is necessary to open the switchplate. The double reader head apparatus is similar to the single reader head apparatus except that it contains a translator assembly intermediate the reader heads and the switchplate for translating reader head triggering into a switchplate opening only when both of the proper reader heads have been tripped simultaneously.

INVENTOR.
HORACE M. SWARTZ

BY F. W. Anderson
C. E. Tripp

ATTORNEYS

MECHANICAL TOW TRUCK SWITCHING APPARATUS

BACKGROUND OF THE INVENTION

1. Field of the Invention

The mechanical switching apparatus of the present invention finds its use in an automated tow truck system. Tow truck systems are widely used to mechanize and automate freight handling, warehousing, and industrial operations. They are a continuous and versatile conveying medium for towing platform trucks or dollies coded for predestined operation. The trucks are driven by a linked tow chain which is in removable engagement with a tow pin on each truck. The chain can be overhead or in the floor depending on the type of merchandise to be handled and the facility or building in which the system is installed.

2. Description of the Prior Art

There are three references known to applicant disclosing a switching system for use in a tow truck system.

The first of these references is U.S. Pat. No. 3,103,183 issued to L. Bradt et al. on Sept. 10, 1963. This patent discloses a switching apparatus wherein trip rods serve to open a switchplate by tripping a latch pin which is operatively connected to the switchplate. The switchplate has a cam surface for forcing the switchplate back into a closed position after a truck has been diverted by the open switchplate. The system, however, has no means for preventing an inadvertent tripping of the latch pin.

The second known reference is U.S. Re. Pat. No. 25,723 issued to L. Bradt et al. on Feb. 2, 1965. This patent is primarily directed to the tow truck used in a tow truck system, but in addition discloses an overload prevention device that rotates the trigger, that serves to open the switch, into an inoperable position when a particular shunt slot is full of earlier diverted trucks so that the switch will not be opened to divert any further trucks.

The third reference is U.S. Pat. No. 3,261,300 issued to G. K. Johnson on July 19, 1966. This patent discloses a switching system that utilizes a series of links and rotating pivot shafts to open a switchplate when a truck trips a treadle upstream from the switchplate. The treadle is protected by vertical plates on two sides thereof to prevent an accidental tripping. The patent also discloses an overload jam preventive mechanism to prevent more than a certain number of trucks from occupying the same shunt slot.

SUMMARY OF THE INVENTION

For convenience, the switching apparatus of the present invention will be described in connection with an in-the-floor-type tow truck system, but the principles of the invention are equally applicable to an overhead system.

A continuous main slot in the floor provides a communicating channel whereby a tow pin secured to a truck can removably engage a linked tow chain located directly beneath the main slot. The slot also serves as a guide for the truck by confining the two pin between the relatively narrow sidewalls of the slot. The main slot is intersected along its path at selected stations by shunt slots or spurs. Adjacent the intersection of a shunt slot and the main slot is a switchplate for selectively diverting properly coded trucks into the shunt slot. The switchplate is rotatable between an operative open position and an inoperative closed position. Disposed upstream from each switchplate is a reader head which serves to actuate the associated switchplate and rotate it from its normal inoperative position to an operative position whereby an oncoming truck will be diverted into the shunt slot. As the truck passes the switchplate, subsequent to entering the shunt slot, it contacts a cam surface of the switchplate which functions to close the switch.

The coded reader head is a substantially hemispherically shaped trigger adjacent the main slot. The hemispherical portion of the head extends above the floor and has a notch cut in its upstream side for releasably catching a coded probe extending downwardly from the truck. The lower side of the reader head has a depending finger which serves to anchor one end of a push-pull cable whose other end is operably connected with the switchplate for actuation thereof.

The switching apparatus is also provided with a lock on the reader head assembly to prevent accidental tripping of the head, as well as a latch on the switchplate to prevent an inadvertent opening of the switch by means other than the reader head. A control device located in the spur track prevents the switching apparatus from admitting additional trucks to that spur when it is fully occupied.

An alternate arrangement is disclosed which allows for double reader head actuation of the switchplate for use when there are a greater number of shunt slots. With single reader head actuation, the switching system is limited in shunt slots to the number of probe pins on a truck; however, with the double reader head actuation the heads can be combined in numerous combinations to provide for actuation of a greater number of switches and use of a greater number of shunt slots.

In the double reader head assembly, two reader heads are located upstream from their associated switchplate and are disposed in side-by-side relationship along a path normal to the main slot. The overall switching apparatus is similar to the apparatus utilizing only one reader head except that it contains a translator assembly intermediate the reader heads and the switchplate for translating reader head movement into switchplate opening only when both of the associated reader heads have been tripped simultaneously.

Accordingly, it is an object of the present invention to provide a reliable switching apparatus for use in a tow truck system.

Another object is to provide a switching apparatus which cannot be inadvertently actuated.

Another object is to provide a full spur device to prevent a switch from diverting a truck when there is no more space in the spur for another truck.

Another object is to provide a translating device to prevent opening of a switch unless the proper combination of reader heads has been triggered.

Still another object is to provide a lock on each reader head assembly to prevent an inadvertent tripping of the head.

Still another object is to provide a latch on the switch plate for preventing an opening thereof unless the proper reader head or heads have been triggered.

The manner in which these and other objects of the invention may be obtained will be apparent from the following detailed description and the accompanying drawings.

DESCRIPTION OF THE PREFERRED EMBODIMENTS

Figures 1, 3, 4:
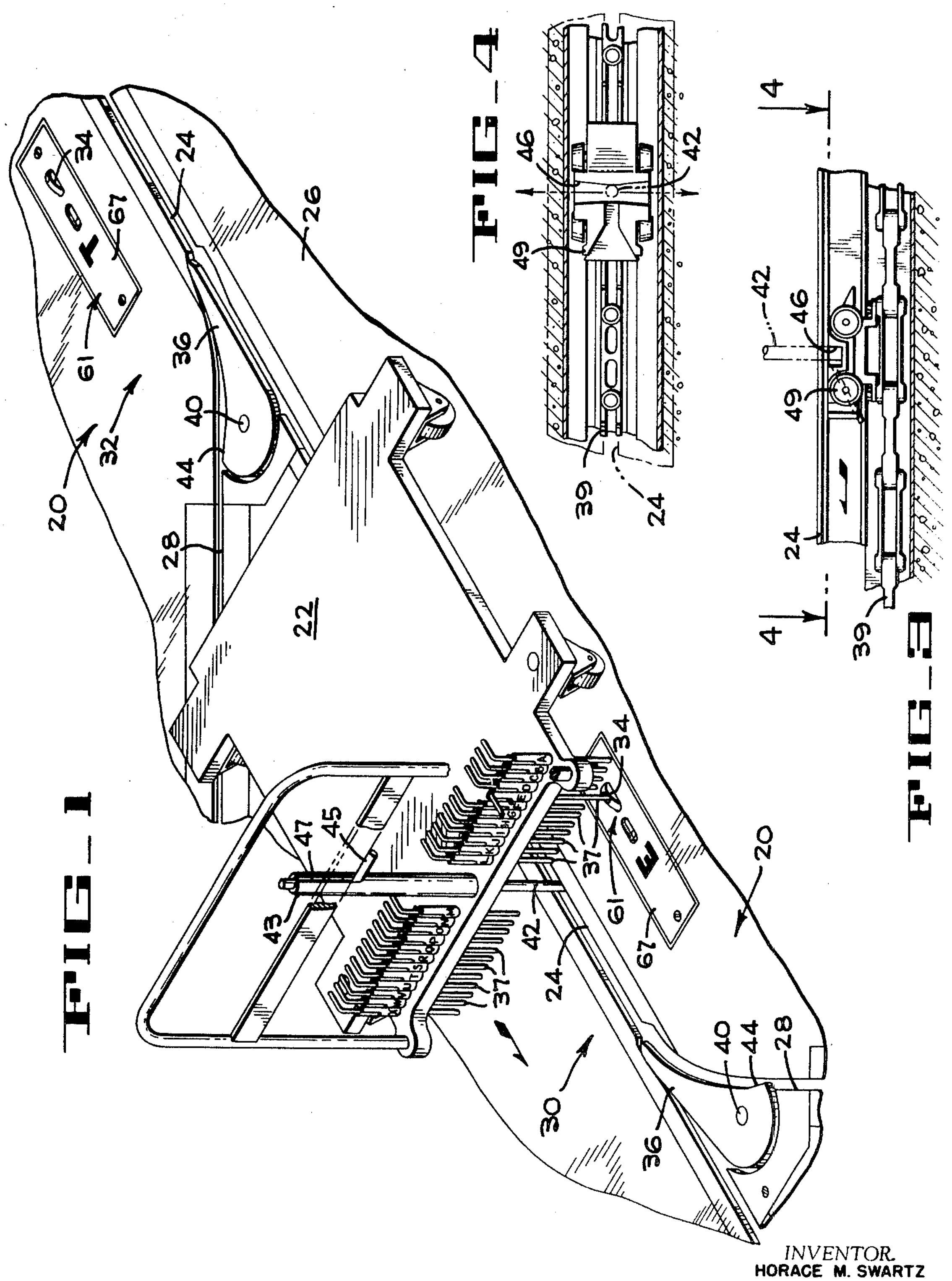
FIG. 1 is a perspective view of a part of the tow truck system showing two switches and a truck which is used in the system.
FIG. 3 is an enlarged fragmentary elevational view showing the chain and pusher used for towing the trucks.
FIG. 4 is an enlarged fragmentary plan view of the chain and pusher showing how the trucks are disengaged from the pusher when desired, the view being taken looking in the direction of arrows 4–4 of FIG. 3.
Figure 2:
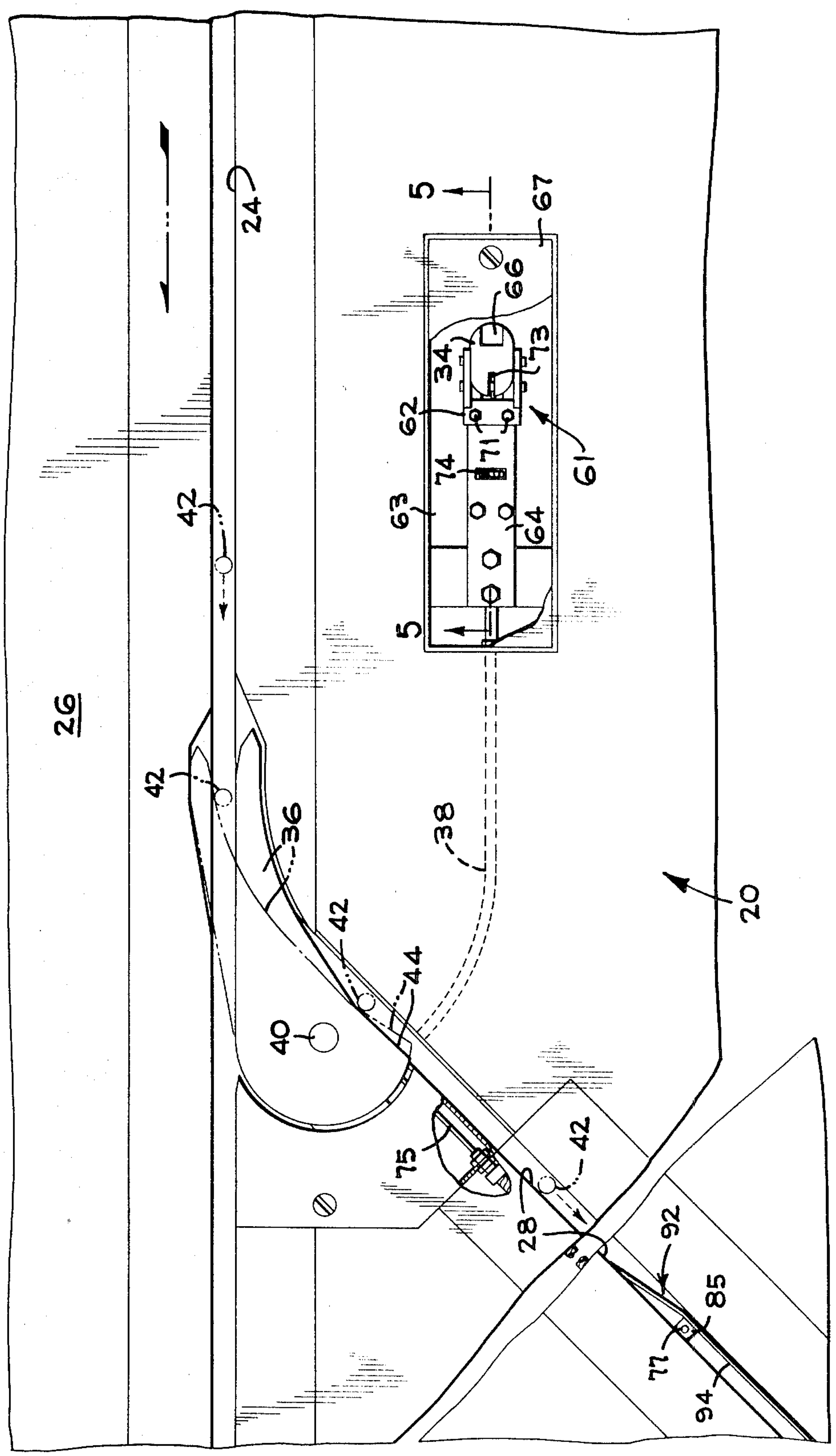
FIG. 2 is an enlarged plan view of one embodiment of the switching apparatus of the present invention wherein only one reader head is used to actuate the switch.

The switching apparatus of the present invention, generally designated 20 in FIGS. 1 and 2, finds it primary use in a tow truck system wherein towed trucks or dollies 22 are towed by a driven linked chain 39 (FIG. 3) along an endless main slot 24 in a reference surface such as the floor 26 of a warehouse. The main slot 24 is intersected at preselected spaced intervals by shunt slots 28 which define stations generally designated 30 and 32, at which selected ones of said trucks may be diverted by the switching apparatus 20.

A typical truck 22 is shown in FIG. 1 while being towed down main slot 24. Near the forward edge of the truck 22 is mounted a vertically slidable tow pin 42 which is manually movable between an operative position, as shown with the lower end of the pin beneath the floor 26, and a raised inoperative position. The tow pin 42 is moved to its inoperative position by raising it within sleeve 43 by means of the handle 45 so that its lower end is above floor level. To leave the tow pin in its inoperative position, the handle 45 is merely rotated above the sleeve 43 until it will not slip down into the slot 47. In its operative position, the tow pin's lower end releasably fits into a groove 46 (FIGS. 3 and 4) in the upper surface of a pusher 49 such that when the tow truck 22 has been diverted into the shunt slot 28 by the switching apparatus 20, the tow pin will easily slide laterally out of groove 46 and pass with free motion down the shunt slot 28. The pusher 49 is bolted to the powered tow chain 39 and continually moves directly beneath main slot 24 to tow the trucks therealong. However, as was pointed out above, when the truck 22 has been diverted from the main slot 24 to the shunt slot 28, the truck is no longer towed by the chain because its tow pin 42 slides out of engagement with pusher 49 which remains connected to the tow chain 39 and follows a path beneath the main slot 24.

Disposed on the truck, in alignment transversely of the truck with the tow pin 42, are 24 probes 37, 12 on either side of pin 42, which are mounted in a manner similar to the manner in which the tow pin 42 is mounted. They are manually movable from a lower operable position, wherein the lower end of the probe is slightly elevated from the floor 26, to a raised inoperable position, and serve in their lower operable position to trip coded reader heads 34 which actuate the switching apparatus, as will be explained more fully later. The probes 37 are lettered so that particular trucks can be coded by lowering a selected probe or probes into operable position. For example, the probes could be lettered A to X and probe E could be lowered to its operable position leaving probes A to D and F to X in their raised inoperative positions. This particular truck would then be coded E and could be automatically sent to a station, such as the one indicated generally by reference numeral 30, which is also coded E by the spacing of its associated reader head 34 laterally from slot 24. The manner in which the truck is diverted from the main slot 24 at station 30 by the switching apparatus 20 will become clear with the detailed description below.

The switching apparatus 20 basically comprises the reader head 34 (FIG. 2), a switchplate 36, and a push-pull cable 38 which operatively connects the reader head and the switchplate. As best seen in FIG. 2, when a truck 22 progresses down main slot 24 in the direction of the arrow, it will trip reader head 34 if it is coded to be diverted into the associated shunt slot 28. The reader head 34 rotates as the truck 22 passes thereover and pulls cable 38 which functions to rotate the switchplate 36 from the inoperative, full line position of FIG. 2 to the phantom line operative position whereby the tow pin 42 depending from the truck 22 will be diverted into the shunt slot 28.

Figures 5, 6, 7, 8, 9:
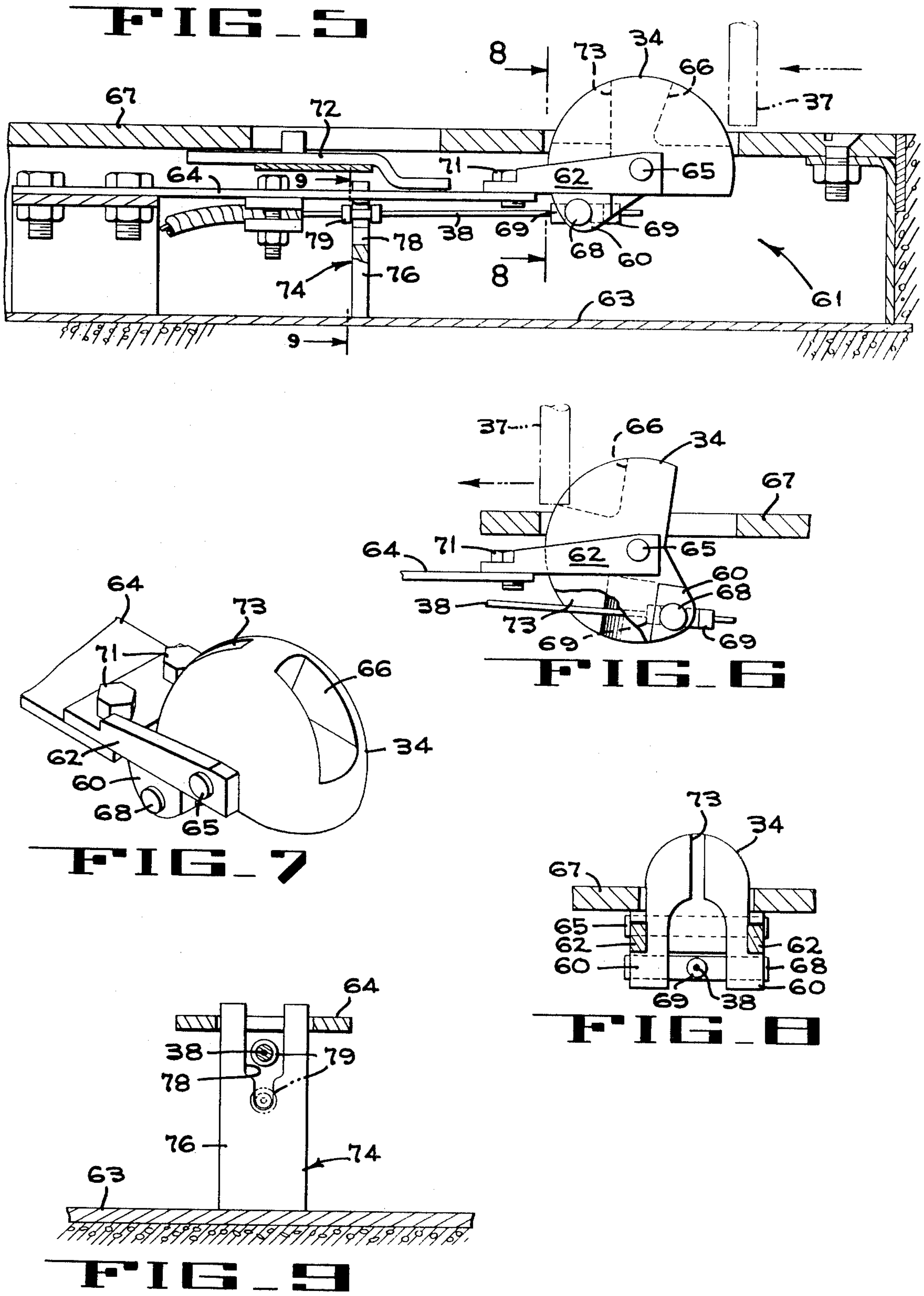
FIG. 5 is an enlarged longitudinal central section through the reader head assembly taken on line 5–5 of FIG. 2.
FIG. 6 is an elevational view of the reader head in its actuated position.
FIG. 7 is a perspective view of the reader head, showing the notch which catches the probes on a truck.
FIG. 8 is a sectional view taken on line 8–8 of FIG. 5.
FIG. 9 is an enlarged sectional view taken on line 9–9 of FIG. 5 showing the lock that prevents an inadvertent actuation of the reader head.

The entire reader head assembly generally designated 61 in FIG. 5 is mounted in a housing 63 having a top 67 with a pair of holes therein through one of which the reader head 34 protrudes, the other hole providing access to a retainer bar 72. The reader head 34 is a generally hemispherically shaped trigger with two arms 60 depending from the bottom thereof to fixedly receive one end of the push-pull cable 38. The reader head 34 is rotatably mounted on a horizontal shaft 65 extending between the two arms of a bracket member 62 which is bolted to a leaf spring 64 by bolts 71, to give the reader head vertical resiliency. A notch 66 is cut in the top and forward surface of the hemispherical portion of the reader head 34 to disengagingly receive the bottom end of a probe 37 as a truck 22 passes thereover. The probe 37 catches in the notch 66 and rotates the reader head counterclockwise, as viewed in FIGS. 5 and 6, about the shaft 65. The push-pull cable 38 is secured by locknuts 69 to a cross-shaft 68 which extends between the two depending arms 60 of the reader head and is rotatable therein. Therefore, as reader head 34 is rotated counterclockwise by a probe 37, the two depending arms 60 of the reader head 34 are moved generally from left to right, as viewed in FIGS. 5 and 6, pulling cable 38 which rotates switchplate 36 from a closed to an open position as will be described later. A notch 73, cut in the back part of the hemispherical portion of reader head 34 fits over cable 38 when the reader head is rotated to allow for a full rotation, as seen in FIG. 6.

If it is desired that a shunt slot 28 be made inactive, reader head 34 can be manually depressed below the floor level and retained in that position by sliding retaining bar 72 forward until it overlies the depressed bolts 71. With the reader head retained below floor level, the probes 37 cannot trip the reader head to actuate the switchplate 36. Therefore, the switchplate remains in a closed position and no trucks 22 are diverted out of the main slot 24 into that particular shunt slot.

To prevent an inadvertent tripping of a reader head by means other than a probe 37, a keyhole lock, generally designated 74 in FIGS. 5 and 9, is provided beneath top 67 immediately behind the depending arms 60 of the reader head 34. The lock 74 includes an upstanding rib 76, which has a slot 78 cut in its upper edge, and is mounted on the lower wall of casing 63. The slot 78 has a wide upper portion and a relatively narrow lower portion, also, a part of keyhole lock 74 is a substantially cylindrical spool 79, with an outer diameter less than the width of the upper portion of slot 78 but greater than the width of the lower portion, and with a middle portion of reduced diameter, which is smaller than the width of the lower portion of the slot 78. The spool is secured to cable 38 at a point in vertical alignment with the rib 76. The cable 38 with the spool 79 attached thereto is free to reciprocate horizontally in the upper portion of slot 78 when the switching apparatus is in normal operation because the outer diameter of spool 79 is smaller than the width of the upper portion of the slot 78. However, when cable 38 is depressed, as by a depression of reader head 34, the reduced middle portion of spool 79 slides down into the lower narrow portion of slot 78, and the wider end portions of spool 79 prevent the spool and the cable, to which it is attached, from moving horizontally. This is illustrated in FIG. 9 where the cable and spool in their normal position are shown in full lines, and the cable and spool in their locked depressed position are shown in dotted lines.

Therefore, when the reader head 34 is contacted by a force having a downward component, the reader head will depress, due to leaf spring 64, and the cable 38 and the spool 79 will depress with it. The spool 79 will lock in the lower portion of slot 78 and prevent the reader head from rotating to effect an opening of the switchplate 36.

The switchplate 36 (FIG. 2) is rotatably mounted adjacent the intersection of the main slot 24 and the associated shunt slot 28 on a vertical post 40 so that it can rotate between an open and a closed position. In its open position, shown by phantom lines in FIG. 2, the switchplate 36 presents an abutment across the main slot 24 to divert the tow pin 42 of a truck 22 traveling along the main slot 24 into the adjacent shunt slot 28. Formed on a portion of the switchplate 36 adjacent the shunt slot 28, is a cam surface 44 which presents an abutment across the shunt slot when the switchplate is in its open position. The tow pin 42 of a truck which has been diverted into the shunt slot will engage the cam surface 44 and thereby rotate the switchplate to its closed position, shown by solid lines in FIG. 2, so that other trucks will not be diverted by the switchplate 36 unless they trip the associated reader head 34.

Push-pull cable 38 is operably connected to the switchplate 36 through a latch assembly generally designated 50 in FIGS. 10—13. The latch assembly 50 consists of an H-shaped member 52 welded to and depending from the lower surface of the switchplate 36, a block 54 which is slidable within a U-shaped guide 84 into engagement with the H-shaped member 52 and which is fixedly attached to the end of cable 38 by locknuts 86 (FIG. 11), and a catch arm 56 which extends through the upwardly projecting legs of the H-shaped member 52. The catch arm 56 has a large rear portion 81, and a relatively narrow portion 82 in which a notch 57 is cut to mate with and overlie the medial portion 58 of the H-shaped member when the switchplate 36 is in its closed position. The catch arm 56 also has a cam surface 59 on its large rear portion 81 that is adapted for operable engagement with a cam surface 60 on block 54. The end 55 of catch arm 56, that is opposite cam surface 59, is shaped like a hook and defines a pivot point at which the catch arm can pivot on looped bracket 53, which is secured to one wall of the shunt slot 28.

Figure 11:
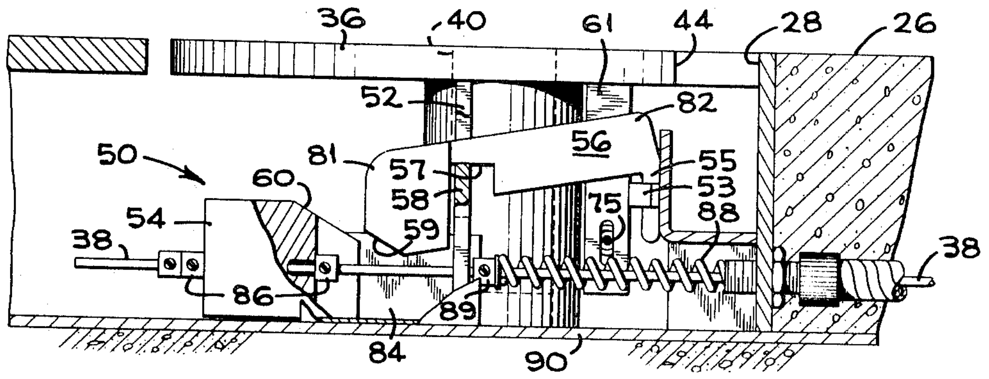
FIG. 11, 12 and 13 are enlarged sections taken substantially on line 11–11 of FIG. 10, showing consecutive operating positions of the latch assembly.
Figure 12:
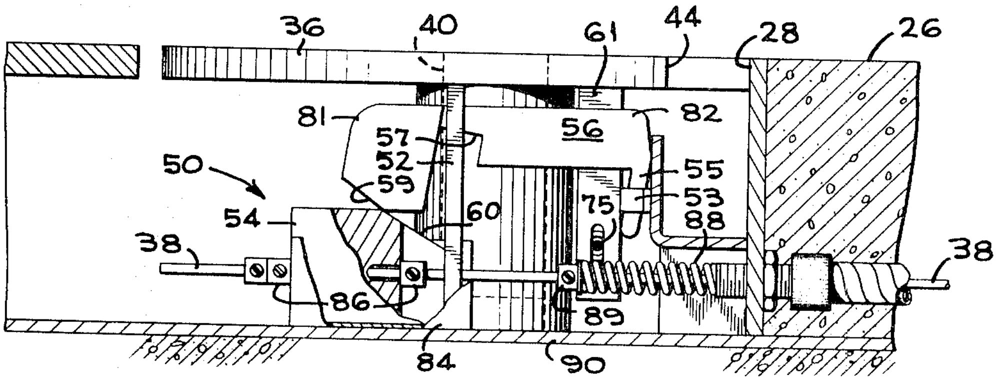
Figure 13:
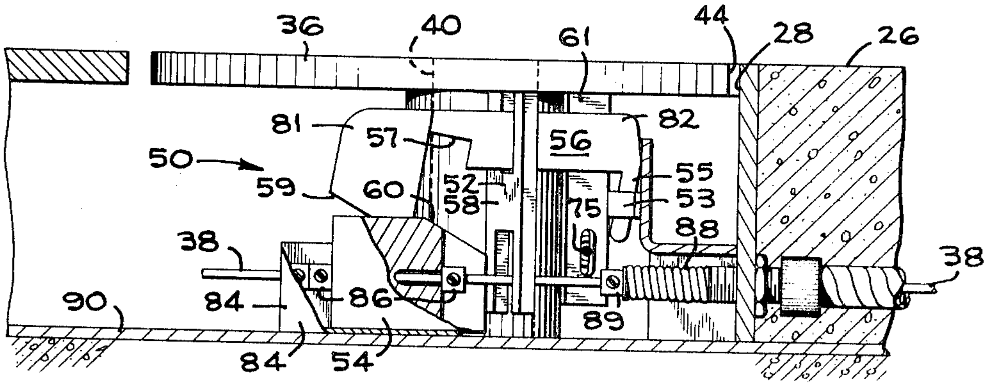

The manner in which the latch assembly functions to open the switchplate 36, and prevent an opening of the switchplate when the associated reader head has not been tripped, is best illustrated in FIGS. 11—13. FIG. 11 shows the positioning of the associated elements of the latch assembly 50 in their normal position when the switchplate 36 is in its closed position. It should be noted that notch 57, in the underside of portion 82 of the catch arm 56, is mated with the medial portion 58 of the H-shaped member 52. While in this position, the notch 57 prevents the H-shaped member from moving any appreciable amount, which also prevents the switchplate 36 from moving any appreciable amount because the H-shaped member is secured to the underside of the switchplate.

When a probe 37, depending from a truck 22, trips a reader head 34 associated with the switchplate 36, the reader head rotates, as shown in FIG. 6, and pulls the cable 38 to the right as viewed in the FIGS. 11—13. The movement of cable 38 to the right also causes block 54 to move to the right since it is secured to the cable by locknuts 86. Movement of block 54 to the right forces the large rear end 81 of catch arm 56 upwardly because of the interaction of cam surfaces 59 and 60. This can be seen in FIG. 12 which shows the positioning of the latch assembly elements shortly after the block 54 has begun to be pulled to the right. It is to be noted that in this intermediate position, notch 57 in the catch arm has been raised out of its mating relationship with the medial portion 58 of the H-shaped member 52 so that the H-shaped member is no longer restricted from movement. Also, the front face of block 54 has come into contact with the face of the H-shaped member 52.

Figures 10, 14, 15:
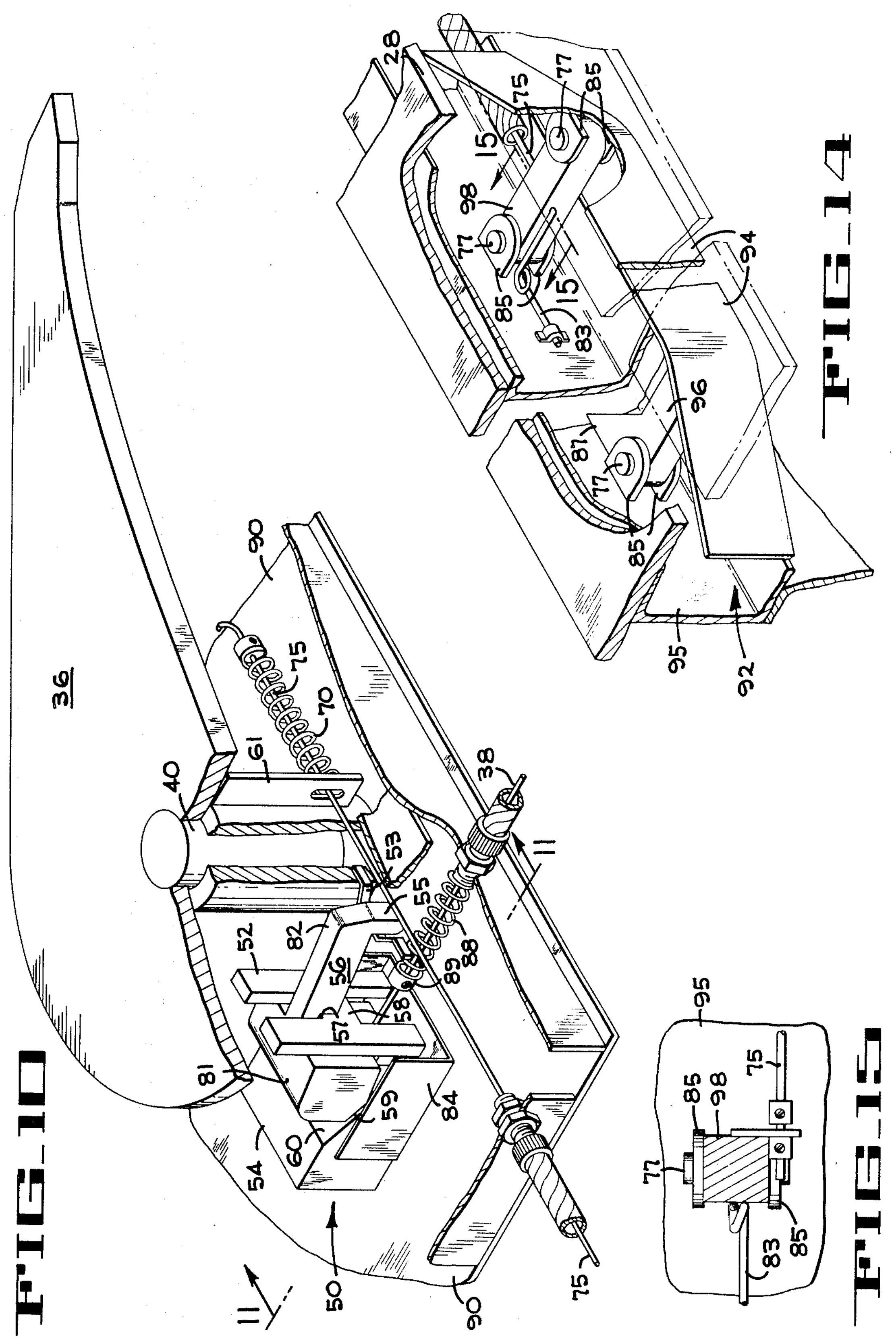
FIG. 10 is an enlarged perspective view of the switchplate and latch assembly showing the relative location of the respective parts.
FIG. 14 is a perspective view of the control device that prevents entry of additional trucks onto a spur line when the spur is full.
FIG. 15 is a sectional view taken on line 15–15 of FIG. 14.

Further movement of the block 54 to the right causes the block 54 to slide under the large rear portion 81 of catch arm 56, FIG. 13, and the elevated nonmating position of the notch 57 allows the block to push the H-shaped member 52 to the right so that it rotates counterclockwise, as viewed in FIG. 10, causing the switch plate 36 to rotate accordingly into its open position. Note that the cam surface portion of the switchplate 36 presents an abutment across shunt slot 28 when the switchplate is in its open position so that a tow pin 42 of a diverted truck 22 can contact the cam surface to force the switchplate back into a closed position.

After the probe 37 has passed over reader head 34, a compressing spring 88 forces the reader head 34 and block 54 back into their normal position. Spring 88 is a coil spring that circumferentially surrounds cable 38 having one end effectively abutting a stationary wall of the housing 90 of the switchplate, and having its other end abutting a collar 89 that is secured to the cable 38. As can be seen in FIGS. 11—13, as cable 38 is pulled to the right by the reader head 34, spring 88 is compressed so that, when probe 37 has passed over reader head 34 and no longer rotates it to actuate the switch, the spring 88 expands back into its normal configuration, and in so doing forces the block 54 back into its normal position, as shown in FIG. 11, and rotates the reader head 34 back to its normal position, as shown in FIG. 5. The return of block 54 to its normal position however, does not change the position of the switch plate 36, the H-shaped member 52, or that catch arm 56. Although it is not positively held, the switchplate 36 remains in its open position until it is closed by a tow pin 42 contacting its cam surface 44. As can be seen in FIG. 13, the forward portion 82 of catch arm 56 lies above and is spaced from the medial portion 58 of the H-shaped member when the switchplate 36 is open and the block 54 is in contact with the member 52. The catch arm 56 remains so positioned, until the block 54 returns to its normal position whereupon the narrow portion 82 of latch 56 drops and rests on the medial portion 58 of the member 52. When the switchplate 36 subsequently closes and causes the H-shaped member to rotate to the left as viewed in FIG. 13, the catch arm will drop into its normal position, shown in FIG. 11, when the medial portion 58 of the H-shaped member gets positioned under notch 57. The switching assembly is then ready for another truck 22 to trip the reader head 34 for actuation of the switch in an identical manner.

The displacement of the reader head 34 from main slot 24 determines how the reader head and its associated switch will be coded. For example, station 30 in FIG. 1 shows the reader head 34 displaced perpendicularly from main slot 24 a distance such that the probe lettered E will trip the reader head when it passes thereover. Therefore, station 30 is coded E, as well as the truck 22 which is shown in FIG. 1 with probe lettered E lowered in an operative position.

As can be seen in FIG. 1, the switching apparatus there illustrated is used to divert trucks in either direction out of the main slot 24. If it were desired to divert trucks to only one side of the main slot, it would still be possible to utilize all of the probes merely by placing the reader head 34 on the opposite side of the main slot from the switchplate 36 and running cable 38 beneath the slot to operatively connect the reader head and the switchplate. In this manner, the above described tow truck system could still have up to 24 shunt slots even though they were all on the same side of the main slot. It is evident that different numbers of shunt slots could be located on the opposite sides of the main slot as long as the total number of shunt slots did not exceed 24.

A control device, generally designated 92 in FIG. 14 and hereinafter referred to as a full spur device is provided to prevent more than a predetermined number of trucks 22 from entering a shunt slot. This is necessary to prevent a jam up of the tow truck system whereby too many trucks are diverted into one shunt slot 28 causing at least one of the trucks to block the main slot 24. The full spur device 92 is pivotally mounted below the floor 26 at a point far enough along the shunt slot 28 that a truck with its tow pin 42 engaging the device will not block trucks moving in the main slot 24. The full spur device 92 is a three-bar parallel linkage cam which includes a bar 94, projecting into the shunt slot 28, and parallel links 96 and 98 which connect the bar 94 to a casing 95 in which the device is mounted. The links 96 and 98 are pivotally connected to the casing 95 as well as to the bar 94 by brackets 85 and pins 77 forming a parallelogram linkage, so that as a tow pin 42 of a truck 22 contacts the bar 94, it will swing out of the way of the tow pin, with the links 96 and 98 swinging clockwise from their normal position shown in FIG. 14. A stop 87, projecting from one end of link 96, prevents the parallel linkage cam from rotating counterclockwise from its normal position by abutting against one sidewall of casing 95. To retain the cam in its normal position, except when a tow pin 42 occupies the shunt slot 28 adjacent the cam, a torsion spring 83 is provided to bias the link 98 in a counterclockwise direction, forcing stop 87 against casing 95. A second push-pull cable 75 operably connects the full spur device 92 to the switchplate 36. One end of cable 75 is secured to link 98 of the full spur device and the other end supports a coil compression spring 70 (FIG. 10). The coil compression spring 70 abuts a collar fastened at one end to the end of cable 75 and has its other end abutting a bar 61 depending from switchplate 36. Bar 61 is secured to the switchplate and has an aperture therein through which cable 75 passes.

It can be seen that, when the full spur device 92 is contacted by a tow pin 42 of a truck 22, the bar 94, which is approximately as long as a truck, is forced toward the casing 95 out of the shunt slot 28, causing links 96 and 98 to rotate in a clockwise direction to pull cable 75. When cable 75 is pulled, spring 70 is compressed and it biases switchplate 36 in a clockwise direction thereby tending to maintain the switchplate in a closed position so that no further trucks will be diverted into the shunt slot. If, while the spring 70 is compressed, another properly coded truck 22 in main slot 24 trips the reader head 34 to activate the switchplate, the switchplate will actually open but due to the added resistance of spring 70, it will close again as the probe 37 releases the reader head 34 before the truck reaches the switchplate. That truck will then remain in the main slot 24 until the full spur device is deactivated releasing the compression of spring 70. It should be stated that main slot 24 is continuous so that a truck 22 that was prevented from entering its predestined shunt slot 28 will come by the shunt slot again at which time it could be diverted into the shunt slot if the slot is no longer full.

An alternate double reader head embodiment of the switching apparatus of the present invention is illustrated in FIGS. 16—22. In this embodiment, simultaneous actuation of two reader heads is necessary to effect an opening of the switchplate 36.

Figure 16:
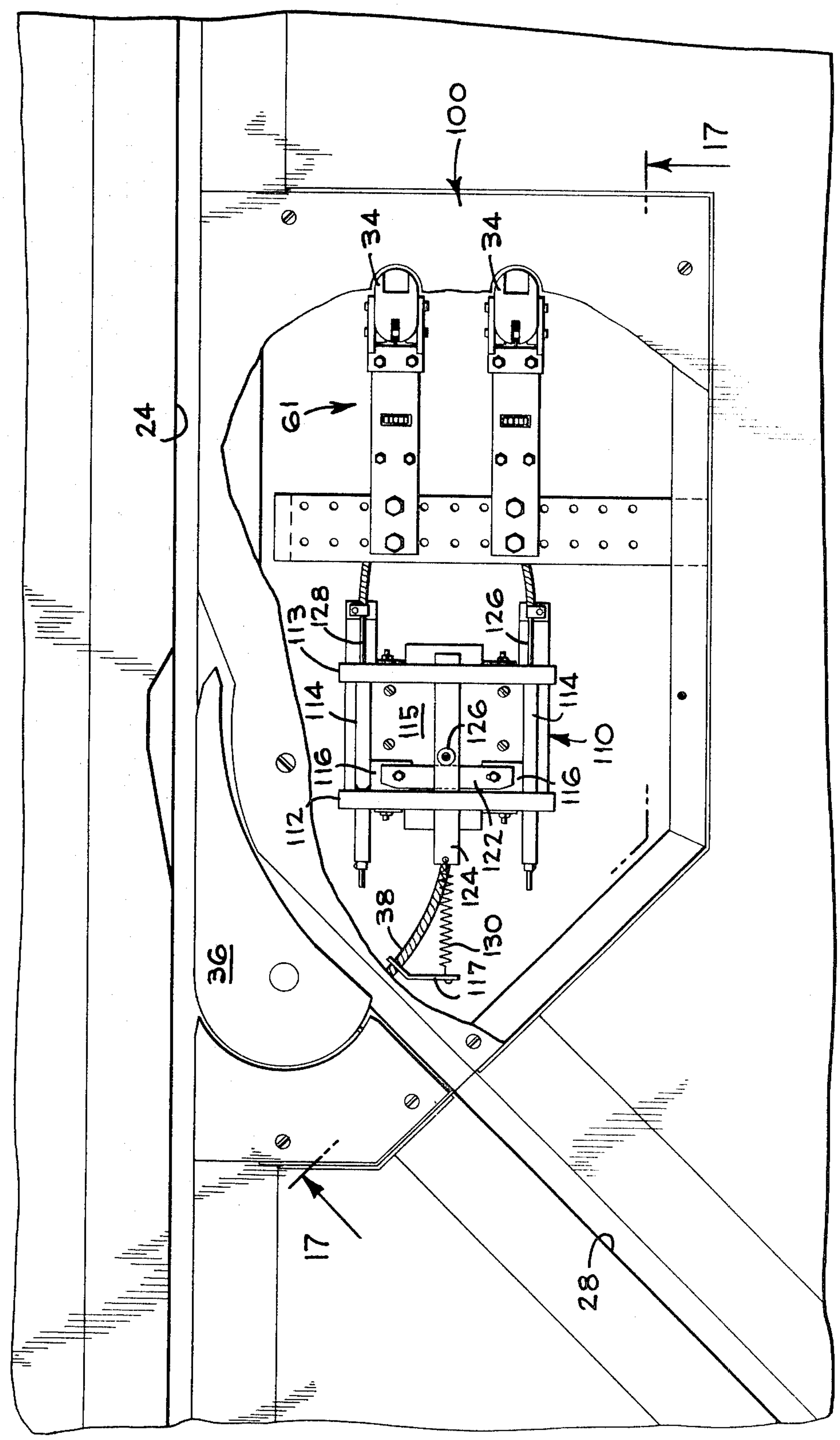
FIG. 16 is a plan view of a second embodiment of the switching apparatus wherein two reader heads are used to actuate the switch.
Figure 17:
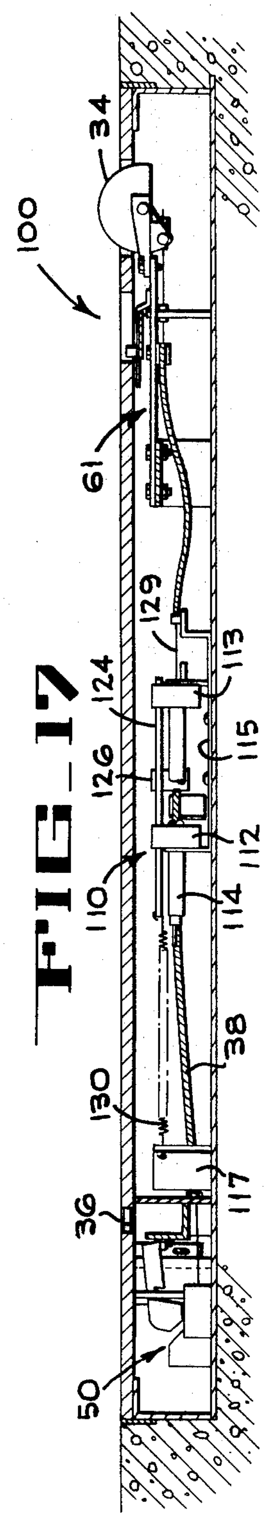
FIG. 17 is a sectional view taken on line 17–17 of FIG. 16, showing the switching apparatus in elevation.
Figure 19:
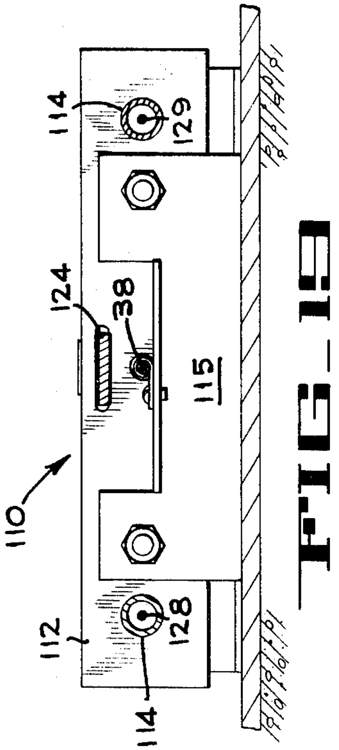
FIG. 19 is a sectional view taken on line 19–19 of FIG. 18.
Figure 18:
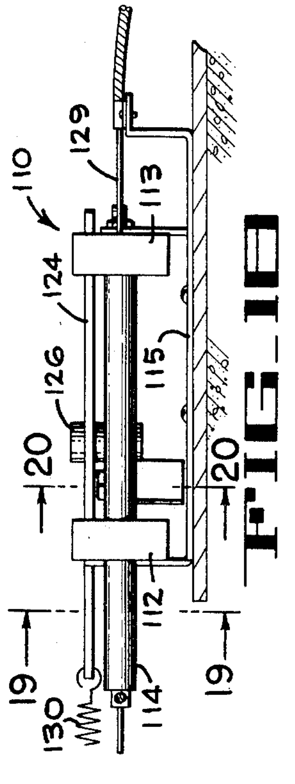
FIG. 18 is an enlarged elevational view of the translator device seen in FIG. 17.
Figure 20:
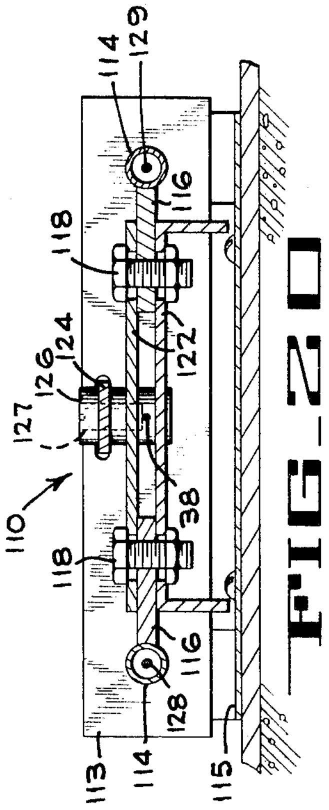
FIG. 20 is a sectional view taken on line 20–20 of FIG. 18.

The double reader head switching apparatus, generally designated 100 in FIGS. 16 and 17, is basically similar to the single reader head switching apparatus 20 except that a translator device, generally designated 110 is inserted intermediate the coded reader heads 34 and the switchplate 36. The function of the translator device 110 is to prevent an opening of the switchplate 36 unless the two coded reader heads 34 associated with the translator device are simultaneously tripped by probes 37 of a truck 22. The trucks used with this embodiment are identical to the trucks 22 used with the single reader head embodiment except that it is necessary to lower two probes 37 into operable position. Since it is necessary that both of the reader heads associated with a particular switch be tripped before the switchplate will open, it is evident that there are many usable combinations of the coded reader heads, resulting in the availability of more shunt slots than are available in the single reader head embodiment.

The reader head assembly 61, switchplate 36, latch assembly 50, and full spur device 92 are all identical to the respective ones of said elements used in the single reader head apparatus. The added translator device 110 is used to connect the reader head assembly 61 to the switchplate and latch assembly. The translator device includes two parallel brackets 112 and 113 (FIG. 16) mounted in spaced relation on an angle iron plate 115 and positioned perpendicularly to the main slot 24. Each of these brackets 112 and 113 has an aperture passing through the opposed ends thereof and is arranged so that the parallel brackets present two sets of aligned apertures for slidably receiving tubes 114 extending parallel to the main slot 24. Each of the brackets 112 and 113 also has a slot, midway between the above mentioned apertures, for slidably receiving an actuating bar 124, which extends parallel to the tubes 114 and has a pin 126 secured thereto. The parallel tubes 114 each have a protruding arm 116 which extends inwardly toward the other one of said tubes. Each arm 116 has an aperture therein for receiving a bolt 118 which serves as a pivot for the opposite ends of two spaced parallel push rods 122 which lie perpendicular to the tubes 114 and actuating bar 124. Passing through a third aperture in bracket 112 approximately midway between the tubes 114 and below the slot for actuating bar 124, is the push-pull cable 38 which has one end secured to the latch assembly 50 beneath the switchplate 36. The cable extends beyond bracket 112 between push rods 122 and is anchored by setscrew 127 in a pin 126, which abuts against push rods 122. Tubes 114 each fixedly receive one end of cables 128 and 129 whose other ends are secured to the reader heads 34 associated with the translator device.

Figure 21:
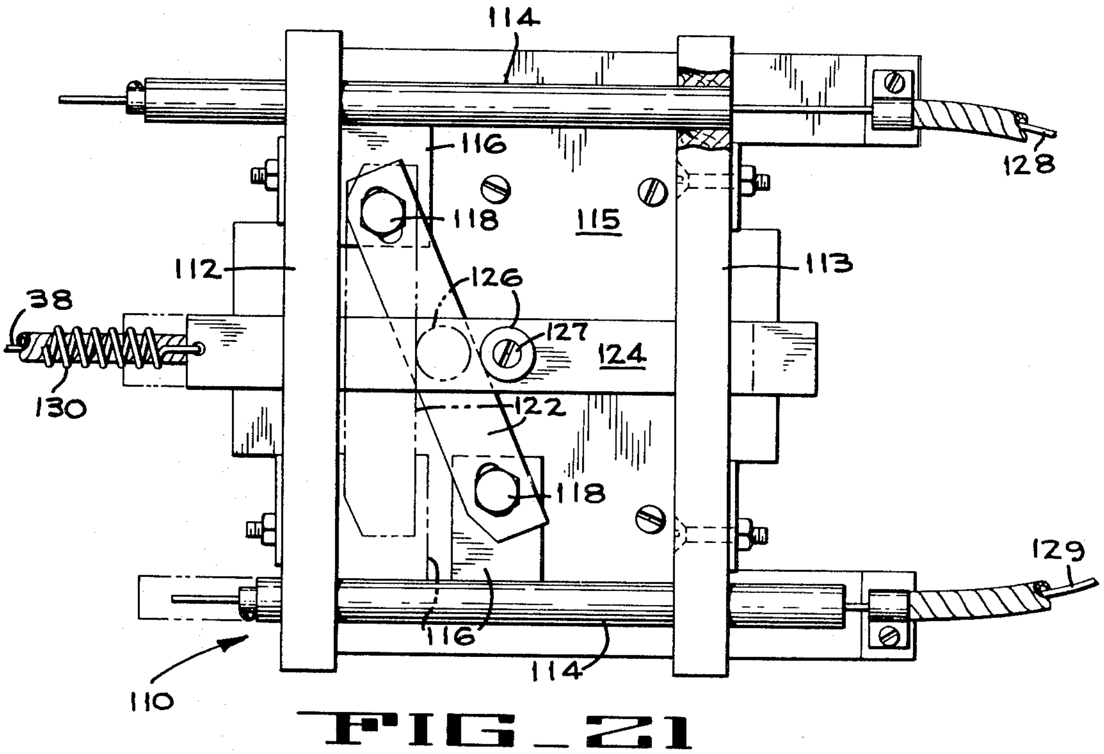
FIGS. 21 and 22 are enlarged plan views of the translator device, illustrating the functioning of the device.

The operation of the translator device 110 can best be explained with reference to FIGS. 21 and 22. Assume that the translator device was associated with reader heads coded E and G connected to cables 129 and 128 respectively, and a truck with coded probes B and E lowered into operable positions passed thereover. The probe coded B would not trip a reader head, but the probe coded E would trip the reader head coded E in the manner explained above with reference to the single reader head apparatus. The reader head would pull cable 129 to the right, as viewed in FIG. 21, causing the tube 114 that contains cable 129 to also shift to the right. The tube 114 containing cable 128 would remain stationary, however, because its associated reader head coded G would not have been tripped. The parallel push bars 122, that are pivotally connected to the tubes 114 via bolts 118 in arms 116, are pulled back on one end so that they lie in oblique relation to actuating bar 124, and have shoved bar 124 back a slight distance by abutting against pin 126 which is secured to the actuating bar 124. This movement stretches coil spring 130 which has one end anchored to a plate 117 and the other end secured to bar 124. The movement of the pin 126, that anchors one end of cable 38 causes the cable 38 to pull block 54 of the latch assembly 50 the same slight distance but it is not enough to open the switch. The block 54 is only pulled to the position it occupies in FIG. 12. After the probe coded E passes over the reader head coded E, the spring 130 contracts to pull the actuating bar 124, pin 126, push bars 122, and cable 129 back to the left to return them to their normal positions. Spring 88 of the latch assembly is biased to return block 54 to its normal position and in so doing supplements spring 130 in returning the elements of the translator device to their normal positions. The translator device is then reset in its normal position.

Figure 22:
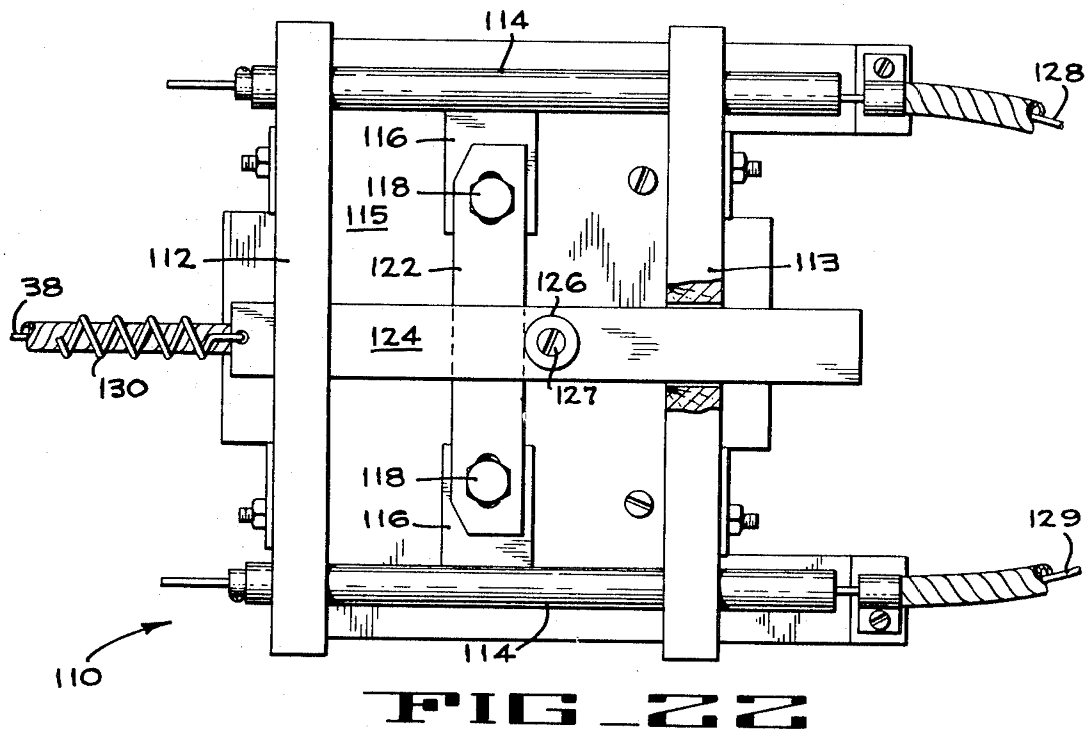

If a truck which is properly coded to actuate the switch passes over the reader heads 34, both of the lowered probes 37 will trip their associated reader heads to cause both cables 128 and 129 to pull to the right as shown in FIG. 22. This pulls the push bars 122 to the right and they shove pin 126 to the right. It can be seen in FIGS. 21 and 22 that when both of the cables 128 and 129 have been pulled, the pin 126 is shoved a greater distance to the right than when only one cable is pulled because the push bars 122 are pulled back so that they are normal to actuating bar 124 rather than oblique to it. This additional movement of pin 126 to the right is enough to pull cable 38 a sufficient distance to cause block 54 to open the switchplate 36. In other words, if both of the reader heads 34 are tripped, the block 54 is caused to move against the H-shaped member 52 and rotate it to open the switchplate 36 as seen in FIG. 13. After the probes 37 have passed over the associated reader heads 34, the springs 88 and 130 will return the operative elements to their normal positions leaving switchplate 36 open to divert the properly coded truck 22 into the shunt slot. After entering the shunt slot the truck will close the switchplate by contacting the cam surface 44 as was explained above.

Although the best mode contemplated for carrying out the present invention has been herein shown and described, it will be apparent that modification and variation may be made without departing from what is regarded to be the subject matter of the invention.

What I claim is:

1. A switching apparatus for use in a tow truck system having a main slot in a reference surface for guiding a truck having a switch-actuating probe, and at least one shunt slot in said surface intersecting said main slot for accepting trucks diverted from said main slot, said switching apparatus comprising in combination a switchplate adjacent at least one intersection of said main slot and said shunt slot, said switchplate being movable between an open and a closed position for physically diverting trucks in said main slot into the adjacent shunt slot, connection means operatively related to said switchplate for movement of the plate from a closed to an open position on actuation of said connection means, and a reader head projecting above said surface and responsive to the horizontal movement of a properly coded truck thereover to actuate said connection means, said reader head being a substantially hemispherically shaped trigger of unitary construction having a notch cut in its upwardly projecting surface to disengagingly receive said actuating probe on said truck to thereby actuate said connection means.

2. A switching apparatus for use in a tow truck system having a main slot in a reference surface for guiding a truck and at least one shunt slot in said surface intersecting said main slot for accepting trucks diverted from said main slot, said switching apparatus comprising in combination a switchplate adjacent at least one intersection of said main slot and said shunt slot movable between an open and a closed position for physically diverting trucks in said main slot into the adjacent shunt slot, first connection means operatively related to said switchplate for movement of the plate from a closed to an open position on actuation of the said first connection means, a translator device operatively related to the opposite end of said first connection means for actuation of the first connection means upon activation of the said translator device, second and third connection means operatively related to said translator device to activate said device only when both said second and third connection means have been simultaneously actuated, and two reader heads projecting above said surface and responsive to the horizontal movement of a properly coded truck thereover to actuate said second and third connection means respectively, said reader heads being resiliently mounted for depression below said surface to prevent actuation of said second and third connection means when said heads are acted upon by a force or forces having a downward component.

3. The switching apparatus of claim 1 wherein the said switchplate has a cam surface thereon for moving said switchplate from an open to a closed position when contacted by a truck in said shunt slot.

4. The switching apparatus of claim 2 wherein the said switchplate has a cam surface thereon for moving said switchplate from an open to a closed position when contacted by a truck in said shunt slot.

5. The switching apparatus of claim 2 further comprising locking means connected to said second and third connection means to prevent activation of said translator device when downward forces are applied to said reader heads.

6. The switching apparatus of claim 1 further including a latch assembly attached to said switchplate to prevent movement of said switchplate from a closed to an open position unless moved by said connection means.

7. The switching apparatus of claim 2 further including a latch assembly attached to said switchplate to prevent movement of said switchplate from a closed to an open position unless moved by said first connection means.

8. The switching apparatus of claim 9 wherein said latch assembly comprises an H-shaped member integral with and depending from said switchplate, a block slidable into engagement with the H-shaped member and fixedly attached to the end of said first connection means that is operatively related to said switchplate, and a catch arm extending through the upwardly projecting legs of the H-shaped member and having a notch therein to normally overlie and latch the medial portion of the H-shaped member to retain the switch in its closed position, said block and said catch arm having mating cam surfaces so that upon actuation of said first connection means, said block will force said catch arm upwardly out of its normal latching position and push said H-shaped member to cause opening of the switchplate.

9. The switching apparatus of claim 1 further including means for preventing more than a predetermined number of trucks from being diverted into said shunt slot.

10. The switching apparatus of claim 2 further including means for preventing more than a predetermined number of trucks from being diverted into said shunt slot.

11. The switching apparatus of claim 2 wherein said translator device comprises two parallel tubes mounted for longitudinally retractable movement and adapted for receiving the ends of said second and third connection means that are operatively related to the translator device for activation thereof, said tubes having arms protruding inwardly toward the other one of said tubes, said arms pivotally receiving the opposite ends of two spaced parallel push rods which serve to actuate said first connection means only if both of said tubes are retracted by actuation of said second and third connection means.

12. A switching apparatus for use in a tow truck system having a main slot in a reference surface for guiding a truck and at least one shunt slot in said surface intersecting said main slot for accepting trucks diverted from said main slot, said switching apparatus comprising in combination a switchplate adjacent at least one intersection of said main slot and said shunt slots, said switchplate being movable between an open and a closed position for physically diverting trucks in said main slot into the adjacent shunt slot and having a cam surface for moving said switchplate from an open to a closed position when contacted by a truck in said shunt slot, a connection means operatively related to said switchplate for movement of the plate from a closed to an open position on actuation of the cable, a latch assembly attached to said switchplate to prevent movement of said switchplate from a closed to an open position unless moved by said connection means, a resiliently mounted reader head projecting above said surface and responsive to the horizontal movement of a properly coded truck thereover to actuate said connection means but which prevents actuation of said connection means when depressed below said surface by a force having a downward component because of a locking means connected to said connection means below said reader head, and means in said shunt slot for preventing more than a predetermined number of trucks from being diverted into said shunt slot.

13. A switching apparatus for use in a tow truck system having a main slot in a reference surface for guiding a truck and at least one shunt slot in said surface intersecting said main slot for accepting trucks diverted from said main slot, said switching apparatus comprising in combination a switchplate adjacent at least one intersection of said main slot and said shunt slots movable between an open and a closed position for physically diverting trucks in said main slot into the adjacent shunt slot and having a cam surface for moving said switchplate from an open to a closed position when contacted by a truck in said shunt slot, first connection means operatively related to said switchplate for movement of the plate from a closed to an open position on actuation of the first connection means, a latch assembly attached to said switchplate to prevent movement of said switchplate from a closed to an open position unless moved by said first connection means, a translator device connected to the opposite end of said first connection means for actuation of the connection means upon activation of the said translator device, second and third connection means operatively related to said translator device to activate said device only when both said second and third connection means have been simultaneously actuated, two resiliently mounted reader heads projecting above said surface and responsive to the horizontal movement of a properly coded truck thereover to actuate said second and third connection means respectively but which prevents actuation of said second and third connection means when depressed below said surface by forces having a downward component because of locking means connected to said second and third connection means below said reader heads, and means in said shunt slot for preventing more than a predetermined number of trucks from being diverted into said shunt slot.

14. The switching apparatus of claim 1 wherein said reader head is resiliently mounted for depression below said surface to prevent actuation of said connection means when said head is acted upon by a force having a downward component.

15. A switching apparatus for use in a tow truck system having a main slot in a reference surface for guiding a truck and at least one shunt slot in said surface intersecting said main slot for accepting trucks diverted from said main slot, said switching apparatus comprising in combination a switchplate adjacent at least one intersection of said main slot and said shunt slot, said switchplate being movable between an open and a closed position for physically diverting trucks in said main slot into the adjacent shunt slot, connection means operatively related to said switchplate for movement of the plate from a closed to an open position on actuation of said connection means, a reader head projecting above said surface and responsive to the horizontal movement of a properly coded truck thereover to actuate said connection means, said reader head being resiliently mounted for depression below said surface when said head is acted upon by a force having a downward component, and locking means connected to said connection means to prevent a movement of said switchplate from a closed to an open position when a downward force is applied to said reader head.

16. A switching apparatus for use in a tow truck system having a main slot in a reference surface for guiding a truck and at least one shunt slot in said surface intersecting said main slot for accepting trucks diverted from said main slot, said switching apparatus comprising in combination a switchplate adjacent at least one intersection of said main slot and said shunt slot, said switchplate being movable between an open and a closed position for physically diverting trucks in said main slot into the adjacent shunt slot, connection means operatively related to said switchplate for movement of the plate from a closed to an open position on actuation of said connection means, a reader head projecting above said surface and responsive to the horizontal movement of a properly coded truck thereover to actuate said connection means, said reader head being resiliently mounted for depression below said surface to prevent actuation of said connection means when said head is acted upon by a force having a downward component, and a latch assembly attached to said switchplate which comprises an H-shaped member attached to and depending from said switchplate, a block slidable into engagement with the H-shaped member and fixedly attached to the end of said connection means that is operatively related to said switchplate, and a catch arm extending through the upwardly projecting legs of the H-shaped member and having a notch therein to normally overlie and latch the medial portion of the H-shaped member to retain the switch in its closed position, said block and said catch arm having mating cam surfaces so that upon actuation of said connection means, said block will force said catch arm upwardly out of its normal latching position and push said H-shaped member to cause opening of the switchplate.

PO-1050
(5/69)

UNITED STATES PATENT OFFICE
CERTIFICATE OF CORRECTION

Patent No. 3,590,742 Dated JULY 6, 1971

Inventor(s) HORACE SWARTZ

It is certified that error appears in the above-identified patent and that said Letters Patent are hereby corrected as shown below:

Column 10, line 1: change "9" to --7--.

Signed and sealed this 9th day of May 1972.

(SEAL)
Attest:

EDWARD M.FLETCHER,JR.
Attesting Officer

ROBERT GOTTSCHALK
Commissioner of Patents